(12) United States Patent
Sargès et al.

(10) Patent No.: US 9,566,913 B2
(45) Date of Patent: Feb. 14, 2017

(54) ROOF RACK FOR MOTOR VEHICLES

(71) Applicant: Scambia Holdings Cyprus Limited, Limassol (CY)

(72) Inventors: Bernard Sargès, Mouroux (FR); Jean-Pierre Neuret, Bussy Saint Georges (FR)

(73) Assignee: Scambia Holdings Cyprus Limited, Limassol (CY)

( * ) Notice: Subject to any disclaimer, the term of this patent is extended or adjusted under 35 U.S.C. 154(b) by 0 days.

(21) Appl. No.: 14/669,675

(22) Filed: Mar. 26, 2015

(65) Prior Publication Data
US 2015/0274084 A1   Oct. 1, 2015

(30) Foreign Application Priority Data
Mar. 27, 2014 (EP) ..................................... 14162147

(51) Int. Cl.
  *B60R 9/04*   (2006.01)
  *B60R 9/00*   (2006.01)
  *B60R 9/058*  (2006.01)
  *B60R 9/052*  (2006.01)
  *B60R 9/045*  (2006.01)

(52) U.S. Cl.
CPC ............... *B60R 9/058* (2013.01); *B60R 9/045* (2013.01); *B60R 9/052* (2013.01)

(58) Field of Classification Search
CPC ............ B60R 9/12; B60R 9/048; B60R 9/058; B60R 9/045; B60R 9/00
USPC ............... 224/315, 321, 309, 325, 326, 329, 330,224/331
See application file for complete search history.

(56) References Cited

U.S. PATENT DOCUMENTS

| 4,496,089 A * | 1/1985 | Eklund .................... B60R 9/058 224/320 |
| 4,982,886 A * | 1/1991 | Cucheran ................ B60R 9/045 224/321 |
| 5,104,019 A * | 4/1992 | Bott .............................. 224/324 |

(Continued)

FOREIGN PATENT DOCUMENTS

| DE | EP 1688304 A1 * | 8/2006 | ............. B60R 9/045 |
| EP | 2426013 A1 | 3/2012 | |

(Continued)

*Primary Examiner* — Justin Larson
*Assistant Examiner* — Lester L Vanterpool
(74) *Attorney, Agent, or Firm* — Reinhart Boerner Van Deuren P.C.

(57) ABSTRACT

Roof rack for motor vehicles is provided, said roof rack comprises a cross member and leg members arranged on both sides of said cross member, each leg member comprising a support unit, which is adapted to rest on a respective carrier bar unit of a body of said motor vehicle, said support unit comprising a retaining unit adapted to be connected to a mounting section of said carrier bar unit, said support unit is adapted to be supported on said respective carrier bar unit and that said support unit comprises a first form locking element designed to cooperate with a second form locking element on said respective carrier bar unit upon movement in a locking direction extending essentially parallel to said cross member in order to provide a form locking fixation of said support unit with respect to said respective carrier bar unit against movement in directions transverse to said cross member.

16 Claims, 6 Drawing Sheets

(56) References Cited

U.S. PATENT DOCUMENTS

| | | | | |
|---|---|---|---|---|
| 5,232,138 | A * | 8/1993 | Cucheran | B60R 9/045 224/321 |
| 5,282,562 | A * | 2/1994 | Legault | B60R 9/058 224/326 |
| 5,385,285 | A * | 1/1995 | Cucheran | B60R 9/045 224/315 |
| 5,588,572 | A * | 12/1996 | Cronce | B60R 9/045 224/321 |
| 5,762,247 | A * | 6/1998 | Cucheran | B60R 9/045 224/321 |
| 5,791,536 | A * | 8/1998 | Stapleton | 224/321 |
| 5,984,155 | A * | 11/1999 | Stapleton | B60R 9/045 224/321 |
| 6,010,048 | A * | 1/2000 | Settelmayer | B60R 9/045 224/315 |
| 6,050,466 | A * | 4/2000 | Cronce et al. | 224/321 |
| 6,102,265 | A * | 8/2000 | Stapleton | 224/321 |
| 6,112,964 | A * | 9/2000 | Cucheran et al. | |
| 6,305,589 | B1 * | 10/2001 | Chimenti | B60R 9/045 224/321 |
| 6,796,471 | B2 * | 9/2004 | Aftanas et al. | 224/321 |
| 7,328,824 | B2 * | 2/2008 | Smith | F16L 3/08 224/309 |
| 7,721,925 | B1 * | 5/2010 | Graffy | B60R 9/058 224/322 |
| 8,393,507 | B2 * | 3/2013 | Aftanas | B60R 9/058 224/309 |
| 8,839,997 | B2 * | 9/2014 | Lundgren | B60R 9/058 224/309 |

FOREIGN PATENT DOCUMENTS

| | | |
|---|---|---|
| WO | WO 96/24509 A1 | 8/1996 |
| WO | WO 2006/130079 A1 | 12/2006 |

* cited by examiner

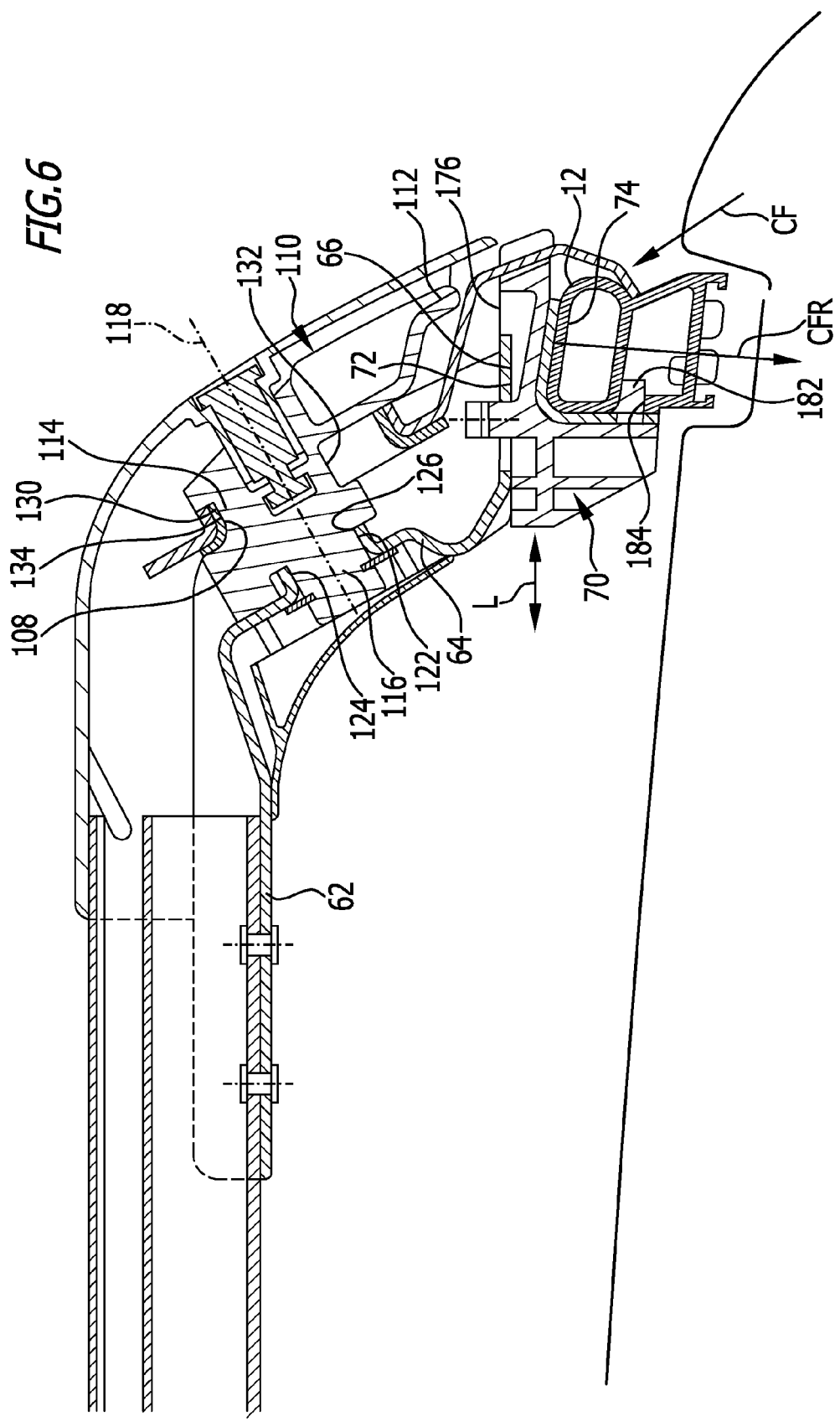

ROOF RACK FOR MOTOR VEHICLES

CROSS REFERENCE TO RELATED PATENT APPLICATION

This patent application claims the benefit of European application number 14 162 147.4 of Mar. 27, 2014, the teachings and disclosure of which are hereby incorporated in their entirety by reference thereto.

BACKGROUND OF THE INVENTION

The invention refers to a roof rack for motor vehicles comprising a cross member and leg members arranged on both sides of said cross member, each leg member comprising a support unit, which is adapted to rest on a respective carrier bar unit of a body of said motor vehicle, said support unit comprising a retaining unit adapted to be connected to a mounting section of said body of said vehicle.

A carrier bar unit is formed by a carrier bar unit extending at a distance from a roof of said motor vehicle and a foot connecting said carrier bar unit to a body of the vehicle. Said foot being realized in various versions, for example by extending over the entire length of the carrier bar unit or only over certain sections of the length of the carrier bar.

Roof racks according to the prior art usually use screws and nuts in order to fix the retaining unit to the carrier bar unit in a position in which the retaining unit exerts a clamping action on said mounting section of said carrier bar unit in order to clamp said support unit against said roof section.

Such connections using screws and nuts usually make it necessary to use a tool in order to fix the retaining unit to the support unit in its position clamping the support unit to said mounting section of said body of said vehicle.

The need to use tools for mounting the roof rack reduces the mounting comfort of the roof rack and also bears the risk that the retaining unit clamps the support unit with respect to the carrier bar unit with unnecessary strong clamping forces so that there is a risk that under load peaks the screw/nut connection breaks.

Therefore it is the object of the invention to provide a roof rack for motor vehicles which has a high handling comfort and which allows mounting of the roof rack with improved safety.

SUMMARY OF THE INVENTION

This object is solved by a roof rack for motor vehicles comprising a cross member and leg members arranged on both sides of said cross member, each leg member comprising a support unit, which is adapted to rest on a respective carrier bar unit of a body of said motor vehicle, said support unit comprising a retaining unit adapted to be connected to a mounting section of said carrier bar unit, wherein according to the present invention said support unit is adapted to be supported on said respective carrier bar unit and that said support unit comprises a first form locking element designed to cooperate with a second form locking element on said respective carrier bar unit upon movement in a locking direction extending essentially parallel to said cross member in order to provide a form locking fixation of said support unit with respect to said respective carrier bar unit against movement in directions transverse to said cross member.

The advantage of the present invention is that a roof rack according to the present invention establishes a form locking connection between the respective support unit and the respective carrier bar unit which provides a more stable connection between the respective support unit and the respective carrier bar unit as known from the prior art, according to which such connection is only a force locking connection and not a form locking connection.

In particular the inventive concept provides a form locking fixation of said support unit with respect to said respective carrier bar unit against movement in directions extending in planes transverse to said cross member so that in particular any forces acting on said cross member due to acceleration and breaking can be received by the form locking connection between the support unit and the respective carrier bar unit.

According to the present invention the definition that the locking direction is extending essentially parallel to said cross member means that said locking direction includes with said cross member an angle which is at maximum 20° or less.

In particular said first form locking element is movable between an unlocking position allowing mounting of said roof rack on said carrier bar units of said body and a locking position providing form locking between the respective support unit and the respective carrier bar unit.

According to the concept as defined till now it would be possible to move the first form locking element with respect to said support unit in various directions, for example it would be possible to connect the first form locking element to said support unit by a hinge so that the movement of the first form locking element between its unlocking position and its locking position would correspond to a swivelling movement about an axis of said hinge.

However a preferred solution provides that said first locking element is guided for movement with respect to said support unit by a guiding arrangement.

In particular such guiding arrangement according to the present invention enables a curved movement, preferably a linear movement, between said unlocking position and said locking position.

In particular said guiding arrangement enables movement of said first form locking element in said locking direction over a distance corresponding at least to the extension of said first form locking element in said locking direction so that it is possible to move the first form locking element over a sufficient distance in said locking direction.

In order to maintain said first form locking element in its locking position an advantageous solution provides that said guiding arrangement is provided with a locking device said locking device blocking movement of said first form locking element from its locking position into its unlocking position.

In particular such a locking device is preferably integrated in the guiding arrangement and in particular increases the safety of mounting of said roof rack.

According to the present invention as defined till now the first form locking element could be an element separate from the support unit and only connected to the support unit by said guiding arrangement.

One particular solution provides said that first form locking element is arranged on a foot element of said support unit.

Such an arrangement of the first form locking element on said foot element of said support unit provides an inexpensive embodiment of the inventive solution.

In case of arrangement of the first form locking element on a foot element of said support unit it is of particular advantage if a support section of said support unit and the foot element are connected by said guiding arrangement allowing said foot element to move in said locking direction.

In this case the connection between the support section and the foot element can at the same time provide the guiding arrangement allowing the movement of the foot element into said locking direction or opposite to said locking direction.

Further such a solution enables an easy integration of said locking device into said guiding arrangement.

For example an advantageous solution provides that said locking device is activated in case said support section rests on a rest surface of said foot element.

This means that in case said support section rests on a rest surface of said foot element the movement of said foot element with respect to said support unit, in particular with respect to said support section of said support unit, towards said unlocking position is blocked by the locking device which is active in this case.

Further it is of advantage if said locking device is deactivated in case said support section is lifted with respect to said rest surface and extends at a distance thereto.

In this case the release of the movement of said foot element with respect to said support section is obtained by lifting the support section with respect to said rest surface over a certain distance which will release the locking action of said locking device.

In particular in case said locking device is deactivated it is provided said support section is sliding on a sliding surface of said foot element.

This sliding surface of said foot element extends essentially parallel to said rest surface but at a certain distance thereto so that the sliding surface can maintain said support section of said support unit at a certain distance from said rest surface and therefore in its unlocked position until the foot element is moved into its locking position in which said support section can drop onto said rest surface of said foot element and therefore activate said locking device.

According to the various embodiments till now the realisation of said form locking element has not been explained in further detail.

One advantageous embodiment provides that that first form locking element comprises at least one retaining protrusion which is preferably extending in or essentially parallel to said locking direction.

Such a at least one retaining protrusion can be realized in different manner.

For example such retaining protrusion can be a pin or have the form of a bar or have the form of a plate extending in said locking direction.

Further an advantageous embodiment of said second form locking element provides that that second form locking element is realized as a recess, in particular a recess in said carrier bar unit.

Such a recess can be provided in the carrier bar or in the foot of the carrier bar of said carrier bar unit depending on the specific dimensions of the carrier bar of said carrier bar unit and the design of the foot of the carrier bar unit.

According to a preferred solution of said roof rack said respective leg member comprises an actuating unit adapted to move said retaining unit in a direction between a release position and a retaining position, in that said actuating unit is provided with a cam element acting on a cam follower element and in that one of said cam element and said cam follower is connected to said support unit and the other is connected to said retaining unit.

The advantage of the inventive concept has to be seen in the use of a cam element and a cam follower element which provide a high handling comfort due to the fact that such a cam element enables a high force amplification so that save clamping of the support unit to the roof section of the body of said car can be obtained by the retaining unit with low power of actuation of said actuating unit.

In particular said actuating unit and said locking device cooperate such that said locking device is maintained in its actuated position, e.g. in its activated position, in case said actuating unit is in said retaining position so that in said retaining position the first form locking element is unable to leave its locking position towards its unlocking position.

The cam element and the cam surface can be designed in various ways. For example it would be possible to design a cam element and a cam surface to abut on each other more or less along a line of contact.

In order to be able to generate a clamping force which is sufficiently high for clamping the support unit against the roof section it is of advantage that said cam element is provided with a cam surface and said cam surface is acting on a cam follower surface of said cam follower element so that the forces per surface area unit are reduced.

In particular reducing the forces per area unit enables to use materials, for example plastic materials, which allow reduction of manufacturing costs.

In accordance with the inventive concept disclosed above the movement of the cam element itself in order to act on the cam follower is not specified in detail.

For example the cam element could be moved along a complex path.

However, a very simple design provides that said cam element is rotatable about a rotational axis so that said cam element can be mounted very easily on the element carrying said cam element.

Further the cam surface itself can have various shapes.

According to a preferred solution said cam surface comprises a release section, a retaining section and a transition section extending between said release section and said retaining section.

In particular at least surface areas of the transition section following each other in direction from said release section to said retaining section are arranged with increasing radial distance from said rotational axis so that when the cam element is rotatable about said rotational axis the transition section can have for example the shape of a section of a spiral.

In order to secure the cam element in its retaining position the retaining section of said cam element comprises a flattened area.

Such a flattened area can be designed such that in case the flattened area is in contact with the cam follower surface rotation of said cam element would make it necessary to further move the cam follower in a clamping direction in order to leave the retaining position so that consequently the cam element will not have the tendency to leave its retaining position and will be maintained in the retaining position due to the cooperation of the flattened area of said cam surface.

In order to also maintain the release position of the cam element another advantageous solution provides that said release section comprises a flattened area which serves the same purpose than explained in connection with the flattened area of said retaining section.

In order to improve the functioning of the flattened area it is further of advantage if said cam follower element is provided with the cam follower surface comprising a flattened area.

For example said flattened area can still serve as the area of contact between the cam surface and the cam follower surface.

One advantageous embodiment provides that said flattened area is the area which is in contact with the retaining section if the cam element remains in its retaining position or is in contact with the releasing section if the cam element remains in its release position and further the flattened surface cooperates with the transition section of said cam surface if the cam element is moved between the release position and the retaining position.

One preferred embodiment of the inventive concept provides that said cam element is rotatably mounted on said support unit and said cam follower element is connected to said retaining unit.

One advantageous embodiment of the present invention provides that said cam follower element comprises a cam follower base with the cam follower opening in which said cam element is arranged.

Such a design is a very simple compact and safe design of the cam follower element due to the fact that the cam element is at least partially surrounded by said cam follower base. In a solution which is of particular advantage the cam follower base is surrounding said cam element so that said cam follower element and said cam element always remain in cooperation with each other.

One preferred embodiment provides that said cam follower surface is carried by said cam follower base.

In particular said cam follower surface is arranged on at least one side of said cam follower opening.

Further it is of advantage if said cam follower surface is arranged on a cam follower insert inserted into said cam follower opening of said cam follower base because then said cam follower base can be manufactured without considering the surface quality required for said cam follower surface and the cam follower surface with the required surface quality can be arranged on said cam follower insert which is inserted into said cam follower opening and maintained by said cam follower base.

In order to provide the necessary surface extension for said cam follower surface a preferred embodiment provides a collar on said cam follower insert which carries said cam follower surface.

Further it is of advantage if said cam follower insert with its collar is supported by a base collar of said cam follower base so that according to this embodiment the collar of the cam follower insert is stabilized by the base collar.

In connection with the various embodiments explained before the connection between the retaining unit and the cam follower element has not been specified.

One advantageous solution provides that said cam follower element is connected to a retaining base of said retaining unit.

Further in connection with the aforementioned embodiments the arrangement of the cam element is not further specified.

One embodiment of particular advantage provides that said cam element is part of an actuating element.

In order to provide that said cam element is rotatable with respect to the support unit one preferred embodiment provides that said actuating element is rotatably fixed to said support unit.

A further advantageous solution provides that said support unit comprises a support element which is provided with a bearing eye in order to receive said actuating element and to enable rotational movement of said actuating element with respect to said support element.

According to a further embodiment said actuating element is provided with an actuating lever which enables tool free manual rotational movement of said actuating element about said rotational axis.

In order to enable secure fixation of said roof rack by said retaining unit one preferred embodiment provides that said retaining unit comprises a retaining element adapted to be received by a receiving element provided in said mounting section of said body.

The advantage of this solution has to be seen in the fact that contrary to embodiments known from the prior art the retaining unit is not only abutting on said mounting section with a surface but the retaining unit is in addition provided with a retaining element entering into a receiving element in order to provide a form locking connection between said retaining unit and said mounting section of said body provided with said receiving element.

An alternate or additional embodiment of the present invention provides that said retaining unit comprises a retaining surface adapted to contact a mounting surface on said body.

In connection with the aforementioned embodiments usually the actuating element is covered by a cover as known from prior art.

According to one advantageous embodiment the cover is adapted to be mounted on said support unit for covering said actuating element only in its retaining position which means that the cover can not be mounted on said support unit unless the actuating element remains in its remaining position.

In particular the cover is designed not to be mountable for covering said actuating element if said actuating element is in its release position.

In order to secure said cover to said support unit it is provided that said cover can be secured to said actuating element by a fixing device so that the cover is only secured indirectly to said support unit.

In particular said fixing device is provided with form locking means which are adapted to be brought in operational connection and out of operational connection with form locking means arranged on said actuating element.

In particular such form locking means are rotatable about an axis of rotation of said fixing device.

Further advantages and features of the present invention are subject matter of the description of a preferred embodiment in the following detailed specification.

BRIEF DESCRIPTION OF THE DRAWINGS

FIG. 6 a sectional representation along lines 6-6 in FIG. 4 with the cover mounted.

DETAILED DESCRIPTION OF THE INVENTION

Figure 1:
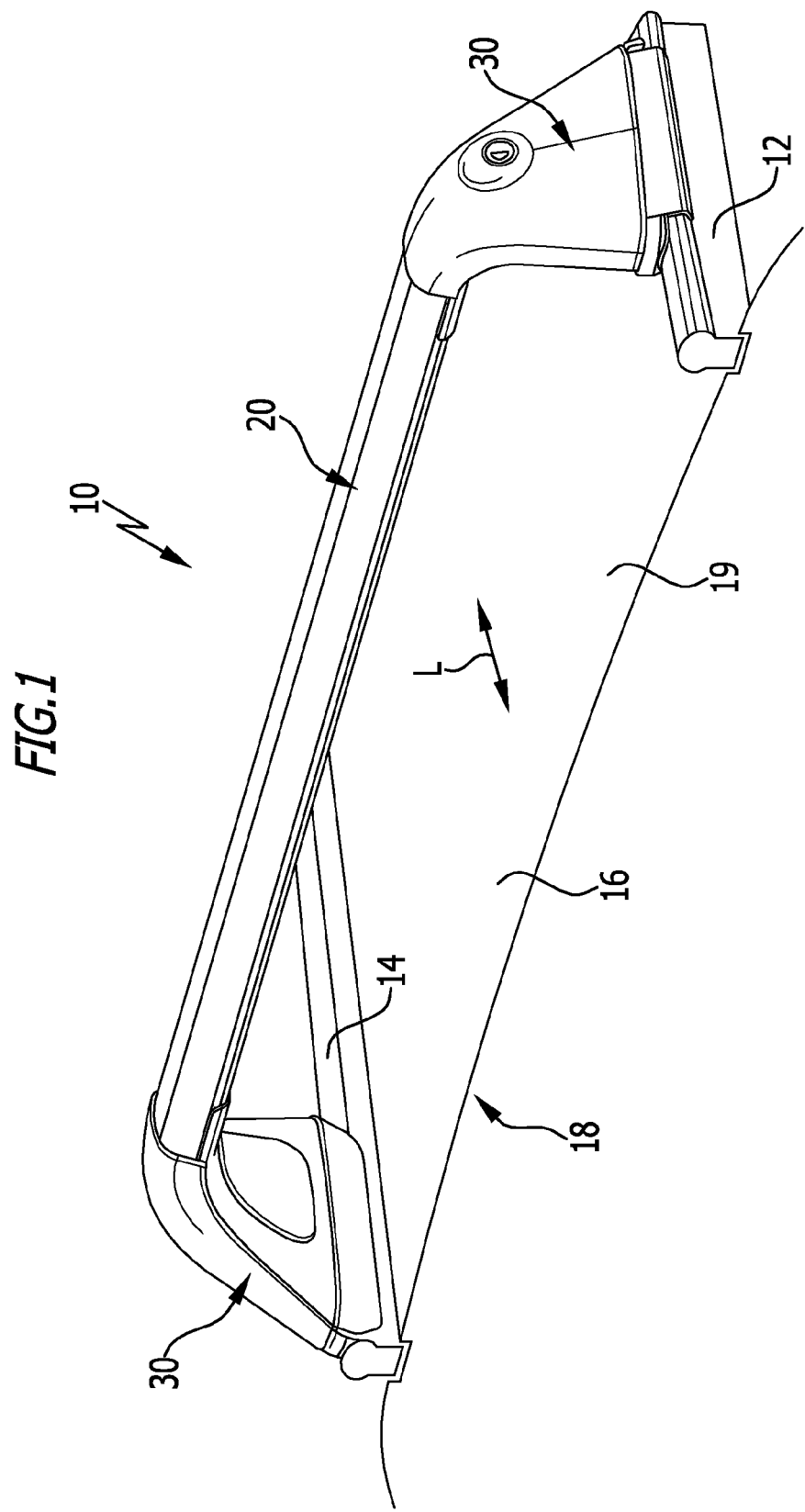
FIG. 1 a perspective representation of a roof rack according to the present invention mounted on a roof section of a body of a vehicle.

A first embodiment of a roof rack 10 according to the present invention is provided for being mounted on carrier bars 12 and 14 being part of a roof section 16 of a body 18 of a vehicle.

The carrier bars 12, 14 extend essentially parallel to a longitudinal axis L of the body 18.

The roof rack 10 comprises a cross member 20 extending transverse to the longitudinal axis of body L with a distance to and above a roof surface 19. Cross member 20 comprises leg members 30 provided at both sides of said cross member 20.

Said leg members 30 are designed to support cross member 20 on carrier bars 12 and 14 and in to fix cross member 20 relative to carrier bars 12, 14.

Figure 2:
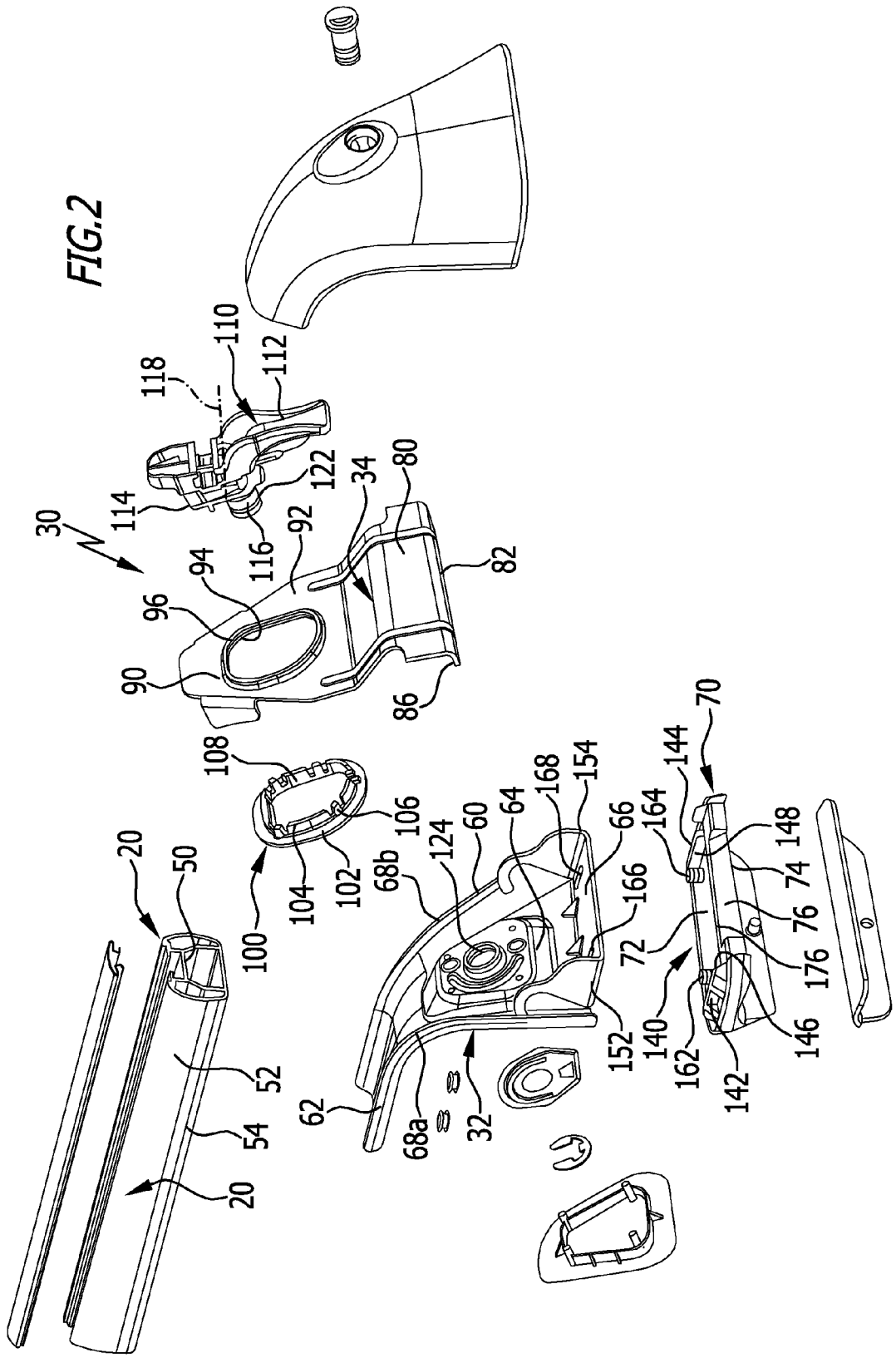
FIG. 2 a exploded representation of a leg member of said roof rack with all its parts.
Figure 3:
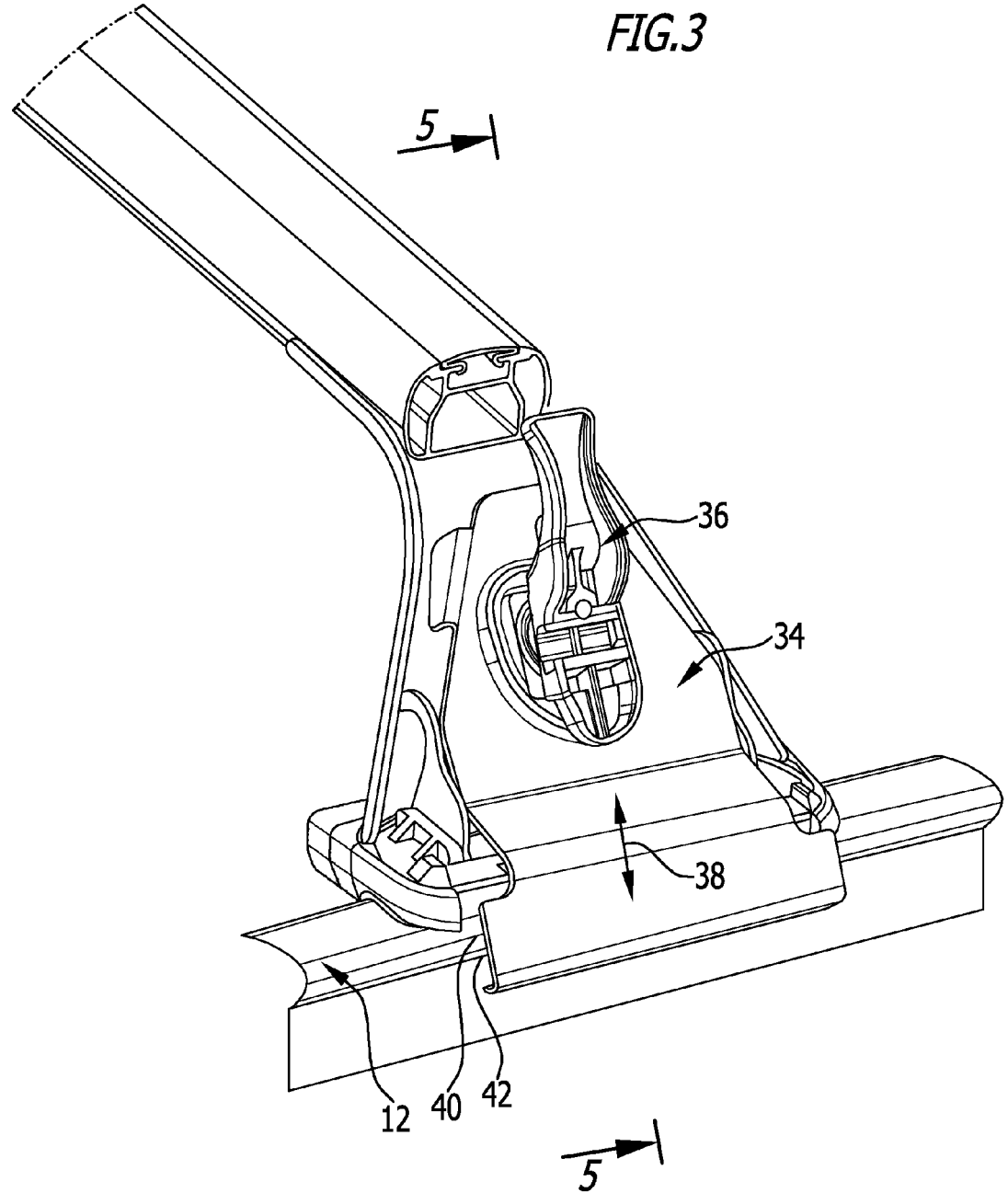
FIG. 3 a perspective representation of one leg member with the cover removed and the actuating unit being in its release position.
Figure 4:
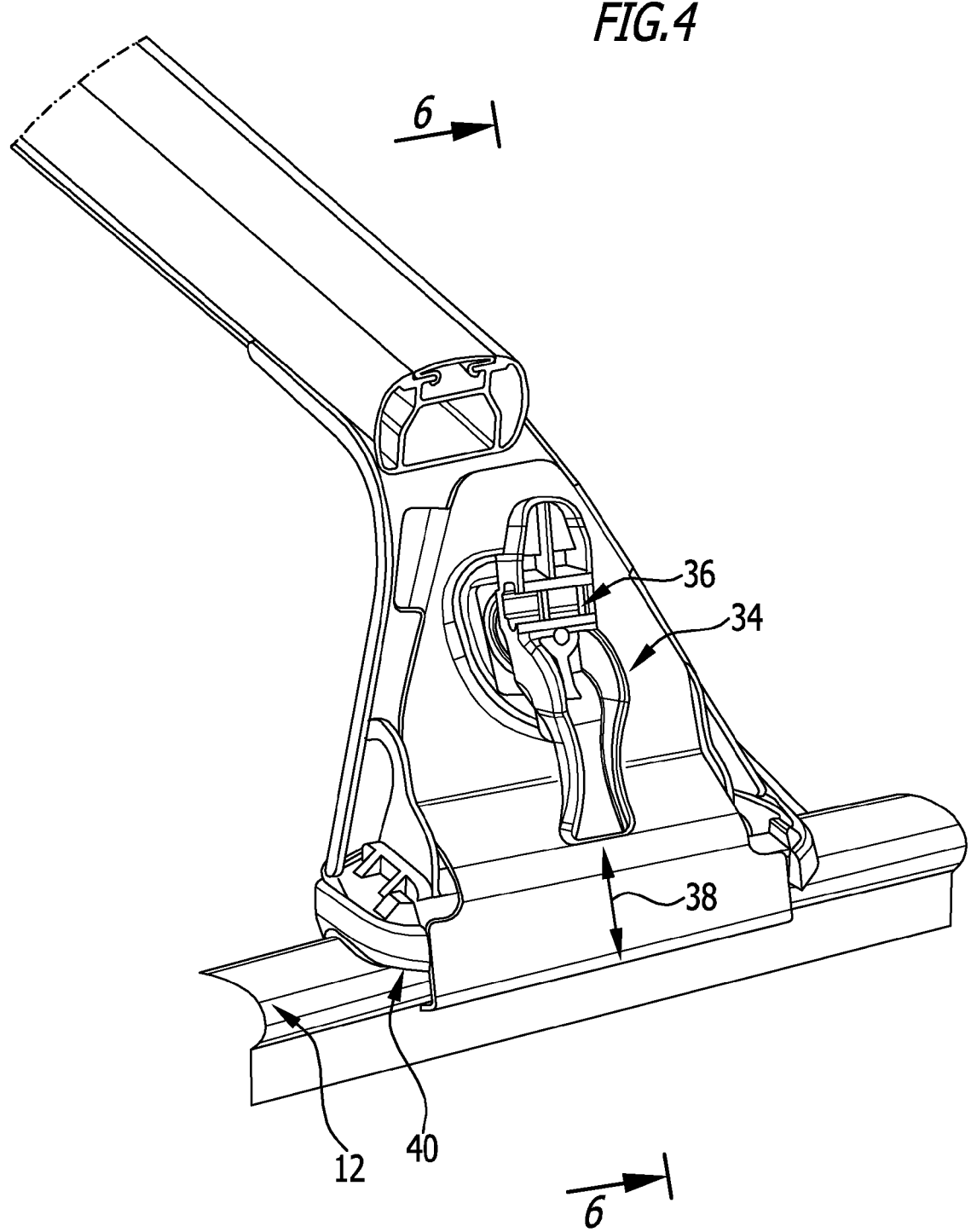
FIG. 4 a perspective representation similar to FIG. 3 with the actuating unit being in its retaining position.

As shown in FIGS. 1 to 4 each leg member 30 is provided with a support unit 32, supporting cross member 20 with respect to carrier bars 12, 14 and a retaining unit 34 which is moveable between a release position, shown in FIG. 3, and a retaining position, shown in FIG. 4, by an actuating unit 36 which is adapted to move retaining unit 34 in a direction 38 running transverse to a mounting section 40 of the respective carrier bar unit 12, 14 and having a mounting surface 42 extending on a side of said respective carrier bar unit 12, 14 which extends on a side of said respective carrier bar unit 12, 14 directed towards to roof surface 18.

As shown in particular in FIGS. 2 to 4 cross member 20 comprises a carrier bar unit 50 surrounded by a sleeve 52 which covers carrier bar unit 50.

Carrier bar unit 50 is provided with an end portion 54 which is received by a receiving section 62 of a support element 60 of said support unit 32 which support element 60 further comprises a base section 64 connecting said receiving section 62 to a support section 66. Further support section 60 comprises two outer wall sections 68a and 68b extending from receiving section 62 along base section 64 to support section 66 and being connected at least to receiving section 62 and base section 64.

Support section 66 is supported by foot element 70 of said support unit 32 which is made of plastic material and comprises a rest surface 72 on which support section 66 is resting and to which support section 66 is fixed in the retaining position as explained later.

Further foot element 70 comprises a support surface 74 with which foot element 70 is sitting on the respective carrier bar unit 12, 14 in particular on upper areas of the respective carrier bar unit 12, 14 arranged opposite to roof surface 19 and forming a carrier surface 78.

Further foot element 70 comprises outer surface 76 directed towards retaining unit 34 and extending between rest surface 72 and support surface 74 and transverse to rest surface 72 and support surface 74.

Retaining unit 34 comprises a retaining base 80 which on one end section carries a retaining portion 82 as well as a retaining element 84.

Retaining portion 82 is extending transverse to retaining base 80 and carries retaining surface 86 which is provided to abut on mounting surface 42 of mounting section 40 of the respective carrier bar unit 12, 14.

Further retaining base 80 on its side opposite to retaining portion 82 is connected to a cam follower element 90 of actuating unit 36 comprising a cam follower base 92 which preferably is formed as one part with retaining base 80 and retaining portion 82.

In an advantageous embodiment cam follower element 90, retaining base 80 and retaining portion 82 are bent from one piece of sheet metal.

Cam follower base 92 further comprises a cam follower opening 94 surrounded by a base collar 96 which extends transverse to cam follower base 92 and is preferably formed as one piece with cam follower base 92.

A cam follower insert 100 is provided to be inserted into cam follower opening 94 and covering base collar 96 on its inner side directed towards cam follower opening 94 by a collar 104 extending transverse to a collar flange 102 which is provided to abut cam follower base 92 on a side opposite to the side on which base collar 96 is arranged.

Further collar 102 is adapted to the shape of base collar 96 and fully supported by base collar 96 in its extension transverse to cam follower base 92. In particular collar 102 is fixed in cam follower opening 92 and fixed to base collar 96 by snap elements 106 arranged on a side of collar 102 opposite to the side of collar of flange 104.

Collar 102 on its inner side provides a cam follower surface 108 used for moving retaining unit 34 in direction 38 by actuating unit 36.

Actuating unit 36 comprises an actuating element 110 which is provided with an actuating lever 112, a cam element 114 and a bearing portion 116, whereas said bearing portion 116 defines an axis of rotation 118 of actuating element 110.

Bearing portion 116 is preferably provided with an outer cylindrical surface 122 which is received in a bearing eye 124 arranged in base section 64 and which is preferably shaped as a ring with an inner cylindrical surface 126 guiding outer cylindrical surface 122 of bearing portion 116.

Figure 5:
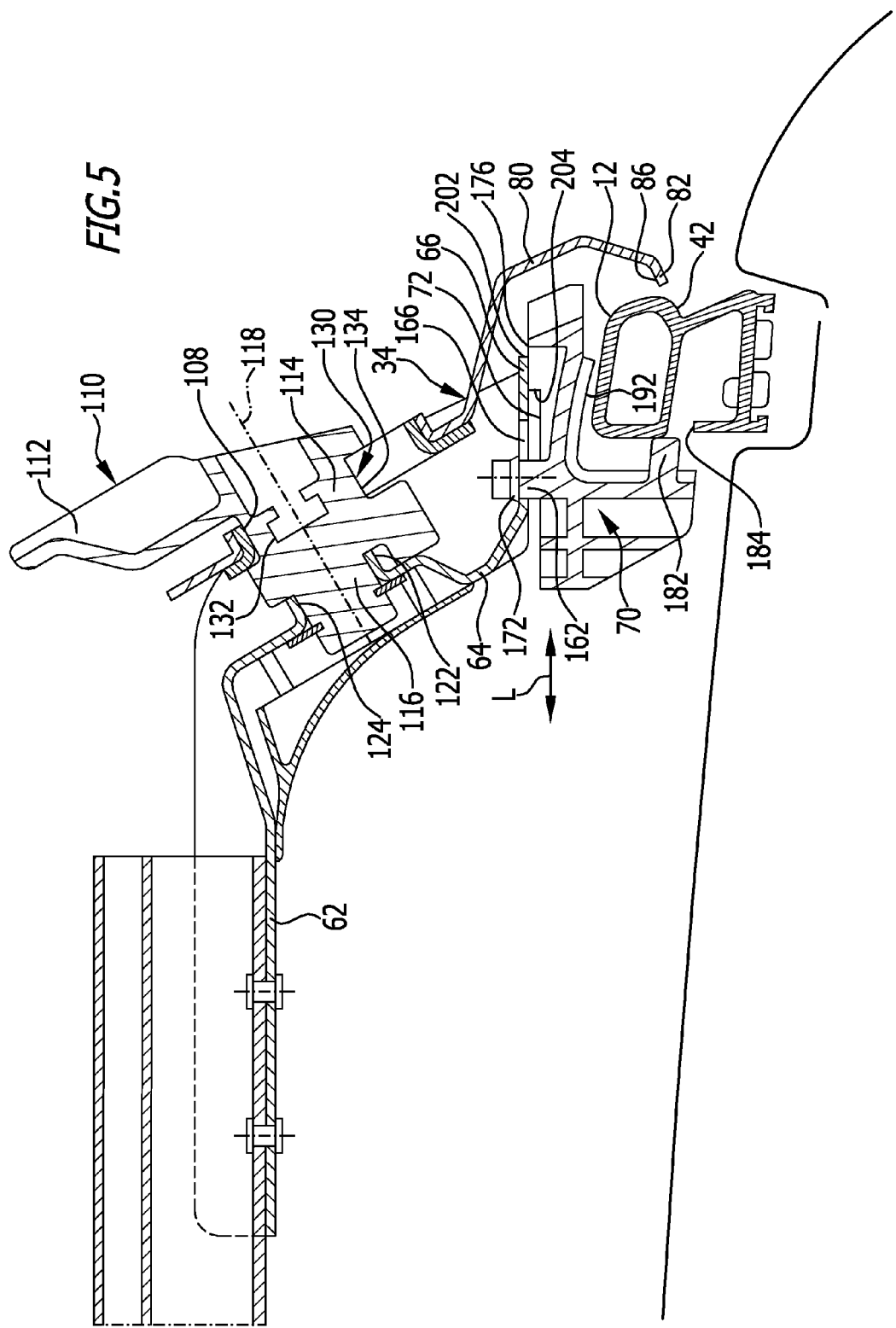
FIG. 5 a sectional representation along lines 5-5 in FIG. 3.

As shown in FIGS. 5 and 6 cam element 114 is provided with a cam surface 130 having a release section 132, a retaining section 134 and a transition section extending between release section 132 and retaining section 134 which sections 132, 134 due to rotation of cam element 114 by an angle α about axis of rotation 118 are able to come in contact with cam follower surface 108 at least with certain areas thereof in order to move cam follower surface 108 in direction 38.

Due to the fact that release section 132 is arranged at the smallest distance from axis of rotation 118 and retaining section 134 is arranged at the largest distance from rotational axis 118 whereas transition section 136 is provided with an increasing distance from rotational axis 118 when extending from release section 132 to retaining section 134, the action of the various sections 132 and 134 on cam follower surface 108 will move cam follower surface 108 and therewith cam follower element 90 at certain distances from rotational axis 118 and therefore move the entire retaining unit 34 with retaining base 80 as well as retaining portion 82 and retaining element 84 in the direction 38 in order to move retaining unit 34 between its release position and its retaining position as disclosed in EP 2 426 013 A.

For example, as shown in FIG. 5, if actuating element 110 is rotated in its release position which means that release section 132 of cam surface 130 is supporting cam follower surface 108 in order to allow retaining unit 34 to move into its lower most direction downwards towards roof surface 19 and mounting section 40 in order to arrange retaining surface 86 in the maximum distance from mounting surface 42 so that retaining element 84 can be moved over mounting surface 42.

As can be seen from FIGS. 3, 5 and 6 foot element 70 is connected to support section 66 by a guiding arrangement 140 enabling foot element 70 to be moved with respect to support section 66 in a direction t extending essentially parallel to cross member 20 and also transverse to carrier bars 12, 14 between an unlocking position shown in FIG. 5 and a locking position shown in FIG. 6.

Guiding arrangement 140 comprises for example two lateral guiding elements 142 and 144 between which support section 66 is received and which guide support section 66 by having guiding surfaces 146 and 148 abutting on lateral side surfaces 152 and 154 of support section 66.

Further foot element 70 is for example provided with two protrusions 162 and 164 extending above rest surface 72 and into elongated openings 166 and 168 which with their longitudinal direction extend parallel to locking direction L so that elongated openings 166 and 168 guide protrusions 162 and 164 in case foot element 70 is moved in locking direction L transverse to carrier bars 12, 14.

Therefore protrusions 162 and 164 and elongated openings 166, 168 can be for example part of guiding arrangement 140.

In order to hold foot element 70 in connection with support section 66 protrusions 162 and 164 are provided with securing elements 172 extending on the side of support section 66 opposite to foot element 70 and preventing protrusions 162, 164 to move through elongated openings 166 and 168.

However securing elements 172 are arranged such that support section 66 can be lifted with respect to rest surface 72 so that foot element 70 can be moved in locking direction L away from carrier elements 12, 14 with respect to support section 66 in case of which support section 66 is sliding on top slide surface 176 of foot element 70 which top slide surface 176 is extending at a certain distance from rest surface 72 on a side of foot element 70 opposite to carrier bars 12, 14 and preferably parallel to rest surface 72.

Guiding arrangement 140 therefore enables movement of foot element 70 with respect to support section 66 and with respect to carrier bars 12, 14 in locking direction L away from carrier bar unit 12 into a mounting position in which a retaining protrusion 182 forming a first form locking element can pass the respective carrier bar unit 12, 14 on its inner side opposite to mounting surface 42 until foot element 70 is abutting with support surface 74 on carrier surface 78 of the respective carrier bar unit 12, 14 if support surface 74 is abutting on carrier surface 78 retaining protrusion 182 is facing a recess 184 forming a second form locking element in the respective carrier bar unit 12, 14 and in which retaining protrusion 182 can be moved into recess 184 by moving foot element 70 in locking direction L towards the respective carrier bar unit 12, 14 into its locking position.

During movements of foot element 70 towards the respective carrier bar unit 12, 14 support section 66 is sliding on top slide surface 176 until an outer edge 202 of support section 66 passes wall surface 204 extending between top slide surface 176 and rest surface 72 so that then support section 66 can move down from top slide surface 176 onto rest surface 72 with outer edge 176 of support section 66 abutting against wall 204, as can be seen in FIG. 6, which wall 204 prevents sliding of foot element 70 in locking direction L towards its unlocking position as long as support section 66 is sitting on rest surface 72.

Only in case support section 66 is lifted from rest surface 72 over a distance corresponding to the height of wall 204 support section 66 can slide on top slide surface 176 in the low foot element 70 to be moved in transverse direction T away from the respective carrier bar unit 12, 14.

Consequently outer edge 202 of support section 66 and wall 204 are forming one example of a locking device 200. However locking device 200 could also be formed by a pin of foot element 70 extending into a respective opening in support section 66 in the locking position.

If cam element 110 is rotated, other areas of the transition section which have an increasing distance from rotational axis 118 will act on cam follower surface 108 in order to move cam follower element 90 together with retaining unit 34 in a direction away from the respective carrier bar unit 12, 14 in order to bring retaining surface 86 into contact with mounting surface 42 so that retaining surface 86 will act with a clamping force CF on mounting surface 42 and as a reaction a clamping force CFR will press support section 66 onto rest surface 72 of foot element 70 which itself will be pressed with support surface 74 on surface 194.

In the retaining position locking device 200 cannot be unlocked because support section 66 is unable to be lifted with respect to rest surface 72.

The invention claimed is:

1. Roof rack for motor vehicles comprising
a cross member and
leg members arranged on both sides of said cross member,
each leg member comprising a support unit, which is adapted to rest on a respective carrier bar unit of a body of said motor vehicle and comprising a retaining unit adapted to be connected to a mounting section of said carder bar unit, said retaining unit being moveable between a release position and a retaining position, said support unit is adapted to be supported on said respective carrier bar unit and said support unit comprises a foot element with which said foot element is sitting on an upper area of the respective carder bar unit said foot element being provided with a first form locking element designed to cooperate with a second form locking element on said respective carrier bar unit upon movement in a locking direction extending essentially parallel to said cross member in order to provide a form locking fixation of said support unit with respect to said respective carrier bar unit against movement in directions transverse to said cross member,said retaining unit having a retaining: surface which in a retaining position is acting with a clamping force on a mounting surface of the respective carrier bar in order to press the foot element on the upper area of the respective carrier bar, wherein said respective leg member comprises an actuating unit adapted to move said retaining unit in a direction between a release position and a retaining position, that said actuating unit is provided with a cam element acting on a cam follower element and that one of said cam element and said cam follower is connected to said support unit and the other is connected to said retaining unit, and
wherein said locking device is maintained in its activated position in case said actuating unit is in said retaining position.

2. Roof rack according to claim 1, wherein said foot element is movable between an unlocking position, allowing mounting of said roof rack, to a locking position.

3. Roof rack according to claim 1, wherein said foot element is guided for a movement with respect to said support unit by a guiding arrangement.

4. Roof rack according to claim 1, wherein said guiding arrangement enables movement of said first form locking element in said locking direction over a distance corresponding at least to the extension of said first form locking element in said locking direction.

5. Roof rack according to claim 1, wherein said guiding arrangement is provided with a locking device, said locking device blocking movement of said first form locking element from its locking position into its unlocking position.

6. Roof rack according to claim 1, wherein a support section of said support unit and the foot element are connected by said guiding arrangement allowing said foot element to move in said locking direction or opposite thereto.

7. Roof rack according to claim 5, wherein said locking device is activated in case said support section rests on a rest surface of said foot element.

8. Roof rack according to claim 5, wherein said locking device is deactivated, in case said support section is lifted with respect to said rest surface and extends at a distance thereto.

9. Roof rack according to claim 8, wherein in case said deactivated locking device is deactivated said support section is sliding on a sliding surface of said foot element.

10. Roof rack according to claim 1, wherein said first form locking element comprises at least one retaining protrusion.

11. Roof rack according to claim 1, wherein said second form locking element is a recess.

12. Roof rack for motor vehicles comprising
a cross member and
leg members arranged on both sides of said cross member, each leg member comprising a support unit, which is adapted to rest on a respective carrier bar unit of a body of said motor vehicle and comprising a retaining unit adapted to be connected to a mounting section of said carrier bar unit, said retaining unit being moveable between a release position and a retaining position, said support unit is adapted to be supported on said respective carrier bar unit and said support unit comprises a foot element with which said foot element is sitting on an upper area of the respective carrier bar unit said foot element guided for a movement with respect to said support unit by a guiding arrangement, said retaining unit having a retaining surface which in a retaining position is acting with a clamping force on a mounting surface of the respective carrier bar in order to press the foot element on the upper area of the respective carrier bar, wherein said respective leg member comprises an actuating unit adapted to move said retaining unit in a direction between a release position and a retaining position, that said actuating unit is provided with a cam element acting on a cam follower element and that one of said cam element and said Cain follower is connected to said support unit and the other is connected to said retaining unit, and wherein said locking device is maintained in its activated position in case said actuating unit is in said retaining position.

13. Roof rack according to claim 12, wherein said guiding arrangement is provided with a locking device, said locking device blocking movement of said first form locking element from its locking position into its unlocking position.

14. Roof rack according to claim 13, wherein said locking device is activated in
case said support section rests on a rest surface of said foot element.

15. Roof rack according to claim 13, wherein said locking device is deactivated, in case said support section is lifted with respect to said rest surface and extends at a distance thereto.

16. Roof rack according to claim 15, wherein in case said deactivated locking device is deactivated said support section is sliding on a sliding surface of said foot element.

* * * * *

UNITED STATES PATENT AND TRADEMARK OFFICE
CERTIFICATE OF CORRECTION

Page 1 of 1

PATENT NO. : 9,566,913 B2
APPLICATION NO. : 14/669675
DATED : February 14, 2017
INVENTOR(S) : Bernard Sargès et al.

It is certified that error appears in the above-identified patent and that said Letters Patent is hereby corrected as shown below:

In the Claims

Column 10, Line 19:
The word "carder" should correctly read --carrier--

Column 10, Line 24:
The word "carder" should correctly read --carrier--

Column 10, Line 32:
A space should be added between the word --member,-- and --said--

Column 10, Line 33:
Remove ":" between --retaining-- and --surface--

Column 11, Line 20:
A --,-- should be inserted after --vehicle--

Column 12, Line 9:
The word "Cain" should correctly read --cam--

Signed and Sealed this
Eighteenth Day of April, 2017

Michelle K. Lee
*Director of the United States Patent and Trademark Office*